United States Patent Office 3,843,329
Patented Oct. 22, 1974

3,843,329
APPARATUS FOR OXIDIZING WASTE MATERIALS
Delton K. Longley, 3537 Cripple Creek, Dallas, Tex. 75224
Filed Nov. 15, 1972, Ser. No. 306,680
Int. Cl. F23c 9/04; F23g 7/06
U.S. Cl. 23—277 C               9 Claims

ABSTRACT OF THE DISCLOSURE

Disclosed is an afterburner apparatus for oxidizing combustible materials such as vaporous gases and effluent gas from an incinerator or the like. The apparatus is fitted into the stack of an incinerator or other primary combustion apparatus so that the effluent gas from the incinerator flows upwardly into the interior of the afterburner apparatus. The afterburner includes a spherical chamber having a refractory lining, an inlet port at the bottom of the afterburner through which the effluent gas is introduced into the chamber and an outlet port at the top of the afterburner diametrically opposite the inlet port. A flame and stream of air are introduced into the lower portion of the chamber at a position near the inlet port and at an angle slightly upward from the horizontal and tangential to the interior surface of the chamber to cause the effluent gas to swirl upwardly. The flame and stream of air cause oxidation of the combustible materials in the effluent gas and the oxidation products then pass out the outlet port at the top of the chamber.

---

This invention relates to an afterburner for oxidizing combustible materials of an effluent gas from an incinerator or similar primary combustion device. The apparatus may also be utilized to oxidize combustible odorous gas.

The air pollution problem, which has reached alarming proportions in many areas, has lead both Federal and State governments to adopt measures to combat the pollution. Additionally, a number of private citizen groups have been established to encourage the adoption and enforcement of such measures. As a result of this perhaps belated concern for the pollution problem, research and development in pollution control methods and devices have received increased attention.

One of the most serious causes of air pollution has been the discharge of smoke, fly ash and other particulate matter into the atmosphere by primary combustion apparatus such as incinerators and the like. A number of secondary combustion devices or afterburners have been proposed for oxidizing the combustible materials of effluent gases from incinerators but such apparatus has often been large, bulky and expensive and considerably less than 100% effective in oxidizing and disintegrating the waste material in the effluent gas. Likewise, many odorous and noxious gases are generated by such commercial operations such as food processing plants, chemical plants and the like. It is therefore desirable that such odorous gases be collected and neutralized as efficiently and inexpensively as possible. Most such odorous gases are combustible and may be readily oxidized in a suitable oxidizing environment.

It is an object of the present invention to provide an afterburner for use with a primary combustion device such as an incinerator which is simple in construction and operation.

It is another object of the present invention to provide such an afterburner which is highly effective in oxidizing and disintegrating waste material in effluent gases from primary combustion devices.

Another object is to provide apparatus for inexpensively oxidizing odorous and noxious gases.

A complete understanding of the present invention and of the above and other objects and advantages thereof may be gained from consideration of the following descripiton of a specific illustrative embodiment presented in connection with the accompanying drawings described as follows.

Figure 1:
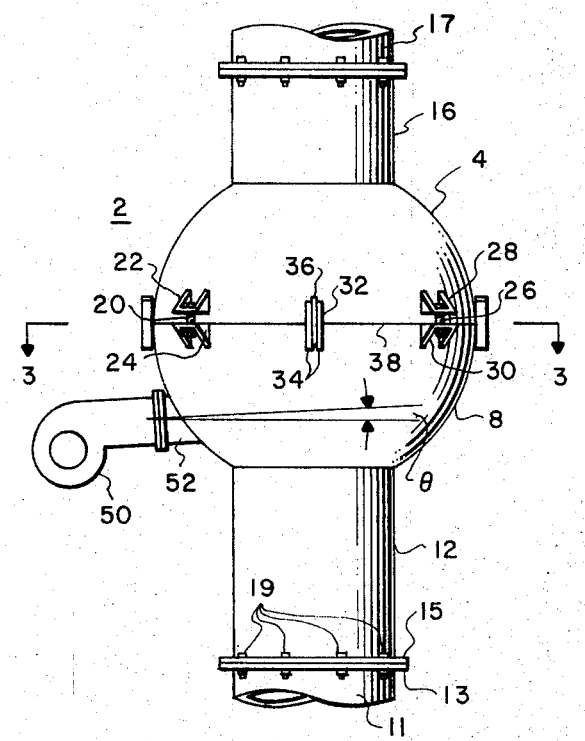
FIG. 1 is a side elevational view of an afterburner apparatus made in accordance with the present invention.

In FIG. 1, there is shown an afterburner made in accordance with the principles of the present invention and inserted in the stack of an incinerator or other primary combustion device. The afterburner, generally designated 2, includes two hollowed out hemispherical sections 4 and 8 which, when joined together as shown in FIG. 1, define a spherical combustion chamber 6 best shown in FIG. 2. The afterburner also includes two sections of pipe 12 and 16 extending from hemispherical sections 8 and 4 respectively in diametrically opposite directions. Pipe section 12 extends from the underside of hemispherical section 8 downwardly and pipe section 16 extends from the upper side of hemispherical section 4 upwardly. The afterburner 2 is constructed of steel or other suitably sturdy material.

The construction of the afterburner 2 with pipe sections 12 and 16 enable easy installation of the afterburner in existing stack structures. For example, to install the afterburner in an existing stack, a section of the stack may be removed and the afterburner inserted and secured in place of the section as shown in FIG. 1. Stack sections 11 and 17 of FIG. 1 represent portions of an existing stack in which the afterburner 2 is mounted. Any one of a number of different mounting methods may be used to secure the afterburner 2 to the incinerator stack. The method shown in FIG. 1 utilizes a lip 15, provided on pipe section 12, and a corresponding lip 13, provided on stack section 11, to secure the afterburner 2 to the stack section 11. The lips 15 and 13 are fitted and then bolted together by bolts and nuts 19 as shown in FIG. 1. Pipe section 16 is similarly bolted to stack section 17.

The two hemispherical sections 4 and 8 are secured together by bolts 20 and 26 inserted through holes in studs 22 and 24 and 28 and 30, respectively. Studs 22 and 28 extend in a generally horizontal plane from the exterior of section 4 and studs 24 and 30 extend in a generally horizontal plane from the exterior of section 8 as shown in FIG. 1. Additional studs and bolts would be located on the other side of the afterburner not shown in FIG. 1.

To properly position hemispherical section 4 on section 8 prior to bolting the sections together, a plurality of guides, such as guide 32, are provided. Guide 32 includes two vertically-spaced fingers or tabs 34 extending outwardly and upwardly from the outer surface of the section 8 to a level above that of the joint 38 between the sections 4 and 8. The guide 32 further includes a single finger or tab 36 extending outwardly and downwardly from the section 4 to a point below the joint 38 between the two sections. When the sections 4 and 8 are joined together, tab 36 is guided between tabs 34 (and other guides are similarly fitted) to inhibit rotation or or other movement of one section with respect to the other. After section 4 is placed on section 8 so that each of the guides are fitted together as generally shown for guide 32 in FIG. 1, the two sections are bolted together.

Figure 2:
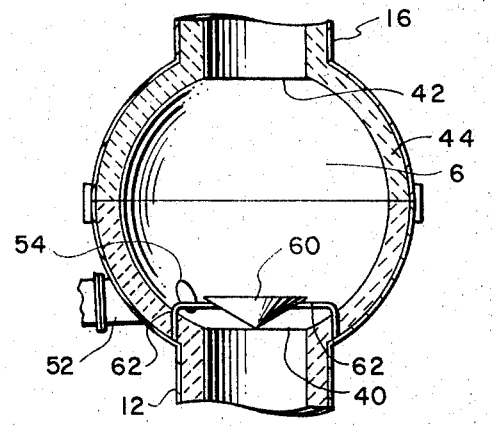
FIG. 2 is a sectional elevational view of the afterburner.

As best shown in FIG. 2, the spherical chamber 6 of the afterburner 2 communicates with the interior of the pipe section 12 through an inlet port generally designated by the numeral 40. The spherical chamber 6 also communicates with the interior of the pipe section 16 through an outlet port generally designated by the numeral 42. And, of course, the interiors of pipe sections 12 and 16 communicate with the interiors of stack sections 11 and 17 respectively. The interior of the spherical chamber 6, as well as the interiors of the pipe sections 12 and 16 are lined with a suitable refractory 44, capable of withstanding temperatures as high as 3000° F. in an oxidizing environment. Many such refractory materials are commercially available in powder form which may be combined with conventional binders to form a slurry or paste which may then be cast in the desired form. In the present invention the refractory paste is molded in place within the sphere to form a lining 44 of about three inches in thickness. Preferably the internal surfaces of the pipe sections 12 and 16 are likewise coated with about a three inch layer of refractory to protect the entire internal surface of the sphere and the adjacent stack from oxidation.

In the preferred embodiment of the invention the internal diameters of pipe sections 12 and 16 (between refractory surfaces) are substantially equal and the large interior diameter of the chamber 6 (between refractory surfaces) is approximately two and one-half to three and one-half times greater than the diameters of the pipe sections 12 and 16.

Positioned on the side of section 8 of the afterburner 2 is a burner unit 50 for introducing a stream of hydrocarbon gas and air into the spherical chamber 6. Any conventional burner designed to inject a burning stream of hydrocarbon fuel and air may be used for burner unit 50. The proportion of air and fuel are independently variable so that the temperature of the injected flame may be adjusted as desired. One suitable burner unit is the Barber Model 5000. This burner has a rated capacity of five million B.t.u. and injects about 5000 ft.$^3$ of natural gas per hour at maximum capacity. It will be understood, however, that the capacity of the burner may vary with the size of afterburner.

The burner unit 50 is bolted onto the end of a pipe section 52 extending generally laterally from the side of the section 8 through which the burner injects burning gas and air through an opening 54 into the chamber 6.

Figure 3:
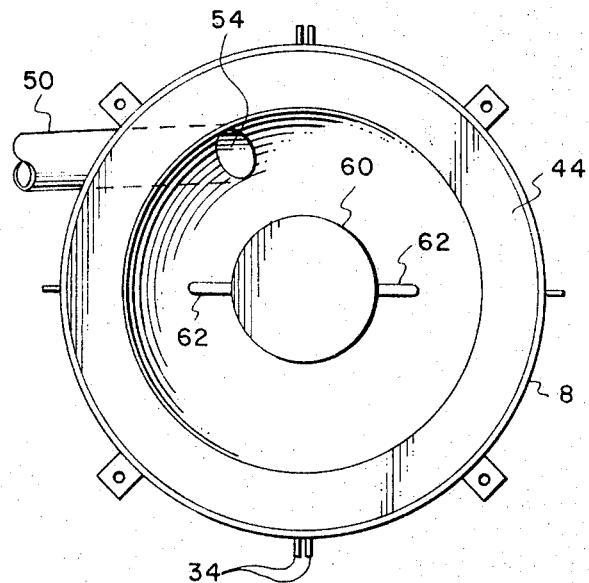
FIG. 3 is a top plan view of the lower hemispherical portion of the afterburner.

The burner 50 and pipe section 52 are positioned on the afterburner so as to direct the flame and stream of air at an angle of about one to five degrees and preferably about two to three degrees upward from the horizontal into the chamber 6 (FIG. 1) and tangential to the wall of the chamber (FIG. 3). The slight incline of the direction of travel of the fuel and air stream is indicated by the symbol $\theta$ in FIG. 1.

In the preferred embodiment of the invention the port 54 is located in the lower one-third of the chamber and preferably in the lower one-third of the lower section 8.

Positioned in the chamber 6 is a conically-shaped baffle 60. The baffle is positioned so that the apex or point of the cone is directed downwardly toward the port 40 and the interior of the pipe section 12. The base of the cone thus faces upwardly toward the port 42 and pipe section 16. Legs 62 extend laterally and downwardly from the sloping sides of the baffle 60 and are secured to the inner surface of the section 8 of the afterburner 2. The legs 62 position the baffle 60 so that the apex of the baffle is nearly contiguous with a plane defined by the inlet port 40 and so that the base of the baffle 60 is at or below the level of the center of the flame feed opening 54. The diameter of the base of the baffle 60 is at least as great as that of the hollow of the pipe section 12. The baffle 60 is composed of or coated with a heat resistant material such as the refractory material used to line the chamber to withstand the high temperatures which are generated in the chamber 6 during the oxidation process. The operation of the afterburner 2 will now be described.

Effluent gases containing combustible materials such as smoke, fly ash and other particulate matter rise from an incinerator or other primary combustion device in the stack 11 and into the pipe section 12 of the afterburner 2. The effluent gases then pass through the inlet port 40 (FIG. 2) and are deflected by the baffle 60 and caused to flow along the interior walls of the chamber 6. The baffle 60 thus prevents gases rising from the primary combustion device from simply passing directly through and out of the afterburner before oxidation can occur.

As indicated earlier, the burner unit 50 directs a flame and stream of air into the spherical chamber 6 at a slight angle upward from the horizontal and tangential to the inside wall of the chamber to cause the effluent gases to swirl and circulate upwardly in the chamber. The flame ignites the combustible materials in the effluent gases, thereby causing oxidation of the materials. The temperature inside the chamber is controlled by controlling the amount and ratio of fuel and air injected through the burner unit 50. The temperature may, therefore, be adjusted as desired to reach a temperature and volume at which the least amount of smoke, fly ash, etc. are discharged from the afterburner. Temperatures of from 1100 to 3000 degrees F. have been used, depending upon the combustible material in the effluent gas. In most cases 1500 to 2000 degrees F. has been found to be most effective in this regard.

Figure 4:
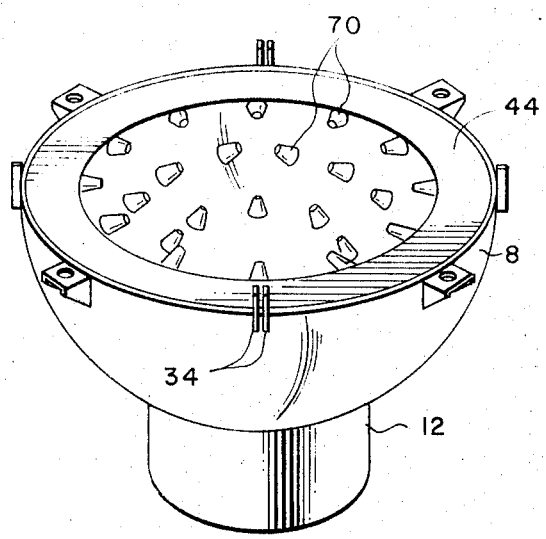
FIG. 4 is a perspective view of the lower hemispherical portion of the afterburner.

The combined action of the baffle 60 and the flame and airstream from the burner unit 50 cause the effluent gases to swirl and circulate at high speed in the chamber 6 so that the particulate matter is forced to strike and grind against the surfaces of the refractory lining. The high volume of hot air injected into the chamber is rapidly mixed with the effluent gases and causes thorough oxidation thereof. By grinding particulate matter against the walls fly ash and the like is disentegrated and more readily combustible. In an alternative embodiment, as shown in FIG. 4, projections such as pyramids 70 or cone-shaped projections may be formed in the refractory surface which extend toward the center of the sphere. By providing projections on the internal surface, a greater surface area is presented to enhance and increase the grinding and abrading action on the particulate matter. The particulate matter is thus reduced in size making it more susceptible to oxidation in the afterburner.

One of the objects of all afterburners is to prolong the time the effluent gas resides in the combustion chamber to insure as complete combustion or oxidation as possible. The spherical shape of the combustion chamber in the present invention facilitates greater swirling and circulation of the effluent gas than heretofore obtained. This swirling action prolongs the time the effluent gases reside in the chamber and this, together with the abrasive action of the particulate matter on the projections of the refractory surface, provides a more complete oxidation of combustible materials in the effluent gases.

The afterburner of the present invention provides a simple and yet effective way of controlling combustible pollutants in effluent gases from primary combustion devices such as incinerators and the like. The afterburner is simple in construction and, because of the ease with which access is gained to the interior of the afterburner, easy to maintain.

It should be noted that in the combustion device disclosed, only a single baffle 60 is utilized. Furthermore, this baffle is placed at the inlet point 40 merely to divert incoming gases and thus is below the highest temperature region of the afterburner. It is, of course, desirable that baffles be eliminated where possible since in conventional afterburners the baffles and their supporting structures are subject to oxidation and thus are eventually destroyed. Since the only baffle employed in the present invention is in a low temperature portion of the device, this problem is virtually eliminated.

While the invention has been described with particular reference to an afterburner for use in connection with a primary combustion apparatus, it will be readily apparent that the apparatus disclosed can be used as a primary combustion device to oxidize odorous and noxious gases where such gases are collected and vented into the inlet port of the device described.

Although the invention has been described with respect to a particular preferred embodiment thereof, many changes and modifications will become apparent to those skilled in the art in view of the foregoing description which is intended to be illustrative and not limiting of the invention. The appended claims are intended to cover such changes and modifications.

What is claimed is:

1. Apparatus for oxidizing combustible materials in a fluid stream comprising
    (a) means defining a spherical chamber, an inlet port positioned in the lower portion of said chamber through which the fluid stream is introduced into the chamber, and an outlet port positioned substantially diametrically opposite said inlet port and through which the oxidized materials pass, and
    (b) means for introducing a flame and a stream of air into said chamber through an opening in the lower portion of said chamber at an angle upward from the horizontal and tangential to the interior wall of said chamber to thereby cause oxidation of the combustible material in said stream.

2. The apparatus of Claim 1 wherein the interior diameters of said inlet port and said outlet port are substantially equal and wherein the large interior diameter of said chamber is approximately two and one-half to three and one-half times the magnitude of the interior diameter of said inlet port and outlet port.

3. The apparatus of Claim 1 wherein said chamber defining means includes two hemispherical sections adapted to be detachably joined together to define said spherical chamber.

4. The apparatus of Claim 1 wherein the angle of direction of the flame and stream of air is from two to three degrees upward from the horizontal.

5. The apparatus of Claim 4 including a refractory lining covering the internal surface of said chamber and wherein said refractory lining includes a plurality of projections extending from the lining generally toward the center of said chamber.

6. The apparatus of Claim 5 wherein each of said projections is formed generally in the shape of a pyramid whose apex extends toward the center of said chamber.

7. The apparatus of Claim 1 further including a conically shaped baffle having a base and an apex and positioned in said chamber above said inlet port so that the apex of the baffle is directed toward said inlet port for deflecting the fluid stream introduced through said inlet port to thereby assist in causing the gases in said stream to swirl and circulate in the spherical chamber.

8. The apparatus of Claim 7 in which said baffle is positioned in said chamber so that the center of the opening through which the flame and airstream are introduced is at least as high as the uppermost part of the base of the baffle plate.

9. The apparatus of Claim 8 wherein the diameter of the base of said baffle is at least as great as the interior diameter of said inlet port.

References Cited

UNITED STATES PATENTS

| | | | |
|---|---|---|---|
| 2,299,849 | 10/1942 | Rees | 60—39.59 |
| 2,498,263 | 2/1950 | Goddard | 431—352 X |
| 3,285,709 | 11/1966 | Ennarino et al. | 23—277 C |
| 3,716,996 | 2/1973 | Maruoka | 23—277 C |
| 3,695,192 | 10/1972 | Von Brimer | 110—8 A |

FOREIGN PATENTS

| | | | |
|---|---|---|---|
| 1,225,709 | 2/1960 | France | 158—99 |

JOSEPH SCOVRONEK, Primary Examiner

M. S. MARCUS, Assistant Examiner

U.S. Cl. X.R.

431—173, 347